April 11, 1961 S. N. HOWELL 2,978,956
VISIBLE AND INFRARED TRANSMITTING LENS COMBINATION
Filed Feb. 12, 1957
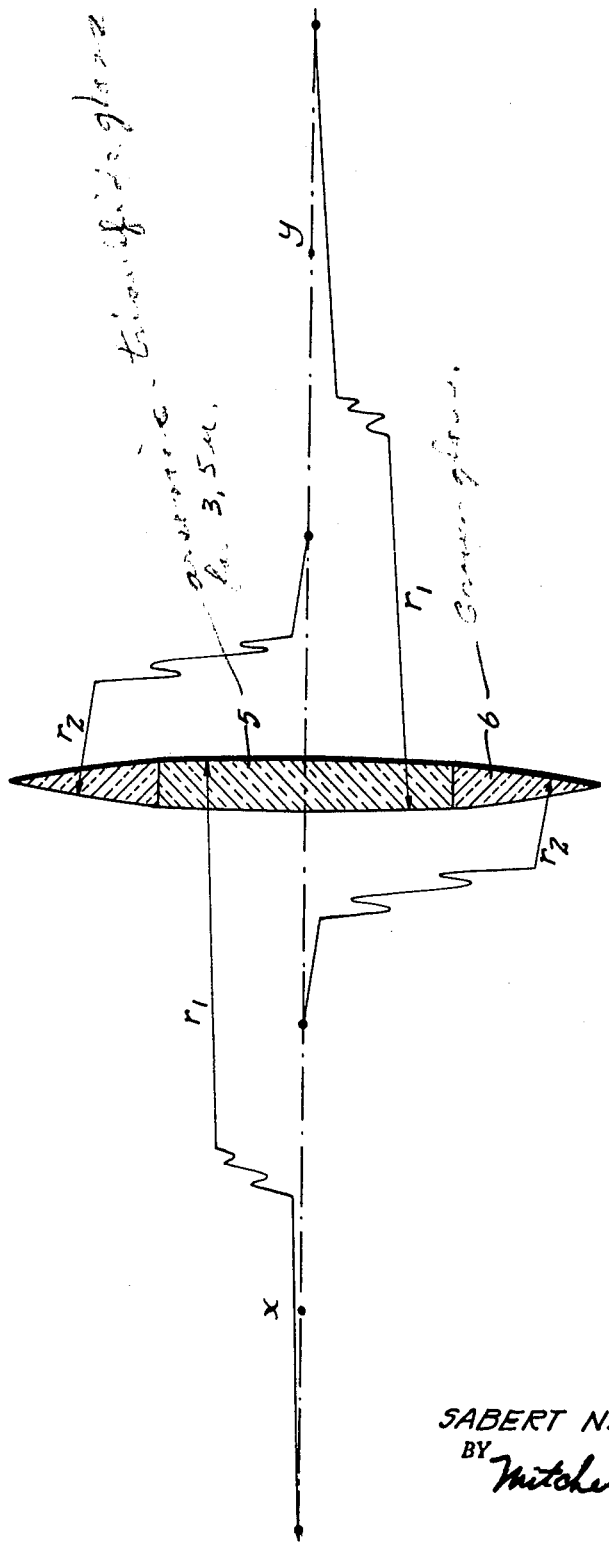
INVENTOR.
SABERT N. HOWELL
BY Mitchell Bichert
ATTORNEYS

United States Patent Office 2,978,956
Patented Apr. 11, 1961

2,978,956
VISIBLE AND INFRARED TRANSMITTING LENS COMBINATION

Sabert N. Howell, Huntington, N.Y., assignor to Servo Corporation of America, New Hyde Park, N.Y., a corporation of New York Filed Feb. 12, 1957, Ser. No. 639,708

1 Claim. (Cl. 88—57)

My invention relates to a multiple element lens configuration.

It is an object to provide an improved device of the character indicated.

Another object is to provide a single lens system having a broader spectral transmittance than is achievable through the employment of a single lens element.

A further object is to employ materials having different spectral transmissions to produce a single lens system having a broader spectral response than is achievable with any one of said materials.

It is also an object to provide a single lens system which may transmit primarily infrared energy but which with the same focal-length characteristics may also transmit visible light, so that precise visual sighting may be achieved for the field of the infrared transmittance.

Other objects and various further features of novelty and invention will be pointed out or will occur to those skilled in the art from a reading of the following specification in conjunction with the accompanying drawing. Said drawing is a section taken along the axis of a lens embodying the invention.

Briefly stated, the invention contemplates the concentric employment of two lens elements having the same focal length but characterized by different spectral transmissions, thus yielding an overall transmittance that is broader than that of either element.

Referring to the drawing, the invention is shown in application to a lens system comprising an inner lens element 5 and an outer or rim lens element 6. Both elements are ground to the same focal length and are cemented together on a common axis. The glass of one element has a different spectral transmissoin than that of the other, and the element transmitting the longer wavelength energy is preferably the central element 5.

In a particular employment of my invention, the central element 5 is primarily transmissive of infrared radiations and may be formed of arsenic-trisulfide glass, while the outer lens element 6 is primarily transmissive of visible light and may be formed of so-called crown glass. The blanks for elements 5—6 are first concentrically cemented to each other. Thereafter, element 5 is ground and then element 6 is ground; polishing of the respective elements preferably follows the same order. For the particular glasses indicated, the focal lengths were designed to coincide for transmission at a wavelength of 546 millimicrons for the crown glass and for transmission at a wavelength of 3.5 microns for the arsenic-trisulfide glass. For a four-inch focal length, this means $r_1=11.070$ inches for the arsenic-trisulfide glass, and $r_2=4.117$ inches for the crown glass; at $1x$ magnification, the object distance (lens to point $x$) equals the image distance (lens to point $y$), and the distance $x-y$ is eight inches.

It will be seen that I have described an extremely simple lens configuration, extending the transmittance range at a given focal length, beyond that possible with any single glass or the like transmission material. In particular application to an infrared system, such as the pyrometer microscope described in my copending application, Serial No. 639,707, filed February 12, 1957, this lens configuration makes possible extremely accurate pyrometer sighting, using visible light which the arsenic trisulfide does not transmit, and yet it can always be known for sure that the infrared-responsive element of the pyrometer is aligned as visually sighted.

While I have described the invention in detail for the preferred form shown, it will be understood that modifications may be made within the scope of the invention as defined in the claim which follows.

I claim:

A lens combination, for separate collection on a common optical axis and for common focus of visible and infrared images of an object to be observed, the infrared image being beyond the range of optimum radiation transmission of visual light-transmitting materials, comprising two individual lens elements concentrically secured to each other and disposed about said axis to collect individual and mutually exclusive ray bundles concentrically of said axis, the material of one of said elements being selected for a first spectral characteristic having optimum transmission of visible light and transmitting visible light substantially to the exclusion of the infrared radiation, the material of the other of said elements being selected for a second and different spectral characteristic having optimum transmission of the infrared radiation and transmitting the infrared radiation substantially to the exclusion of visible light, said lens element transmitting the visible radiations having the same focal length for wavelengths near the middle of the visible spectrum as said lens element transmitting the infrared radiations for wavelengths of about 3.5 microns.

References Cited in the file of this patent
UNITED STATES PATENTS

| 1,979,159 | Howser | Oct. 30, 1934 |
| 2,493,110 | Corman | Jan. 3, 1950 |
| 2,512,257 | Pfund | June 20, 1950 |

FOREIGN PATENTS

| 158,287 | Australia | Aug. 17, 1954 |

OTHER REFERENCES

"New Optical Glasses With Good Transparency in the Infrared," Frerichs, Journal of the Optical Society of America, vol. 43, No. 12, December 1953, pages 1153–1157.